United States Patent [19]

Takahashi et al.

[11] Patent Number: 4,591,319

[45] Date of Patent: May 27, 1986

[54] IN-TANK FUEL FEED PUMP SUPPORTING DEVICE

[75] Inventors: Teruo Takahashi, Zama; Isao Hayashi, Yokohama, both of Japan

[73] Assignee: Nissan Motor Company, Limited, Kanagawa, Japan

[21] Appl. No.: 624,748

[22] Filed: Jun. 26, 1984

[30] Foreign Application Priority Data

Jul. 19, 1983 [JP] Japan .................. 58-131767

[51] Int. Cl.⁴ .............................................. F04B 21/00
[52] U.S. Cl. ...................................... 417/360; 403/223
[58] Field of Search ................ 137/565; 417/360, 363, 417/313; 222/385; 403/220, 221, 223, 224; 285/49, 159

[56] References Cited

U.S. PATENT DOCUMENTS

| | | | |
|---|---|---|---|
| 2,843,314 | 7/1958 | Hansen | 417/363 |
| 4,231,719 | 11/1980 | Ringwald et al. | 417/360 |
| 4,304,530 | 12/1981 | Gens | 417/360 |
| 4,306,844 | 12/1981 | Otto et al. | 417/360 |
| 4,309,155 | 1/1982 | Heinz et al. | 417/363 |

FOREIGN PATENT DOCUMENTS 2440904 3/1976 Fed. Rep. of Germany .
2550950 5/1977 Fed. Rep. of Germany .

Primary Examiner—H. Grant Skaggs
Attorney, Agent, or Firm—Leydig, Voit & Mayer, Ltd.

[57] ABSTRACT

An in-tank fuel feed pump supporting device comprises a plurality of stays and a single pump vibration damping elastic member. Each stay is formed with an oblong elastic member holding recess and the damping elastic member is formed with a plurality of tabs or a flange so as to be fitted to the oblong holding recesses of the stay. The elastic member is so disposed between a fuel feed pump and the stays as to cover the fuel feed pump and be deformed substantially in only shear mode when the fuel pump vibrates in the axial direction thereof. Therefore, it is possible to effectively damp the fuel pump vibration energy, prevent fuel pump noise from being transmitted to the outside of the fuel tank and reduce the manufacturing cost, simultaneously.

8 Claims, 8 Drawing Figures

IN-TANK FUEL FEED PUMP SUPPORTING DEVICE

BACKGROUND OF THE INVENTION

1. Field of the Invention

The present invention relates generally to a fuel tank used for automotive vehicles, and more particularly to a device for supporting a fuel feed pump within a fuel tank, that is, an in-tank fuel feed pump supporting device disposed within a fuel tank.

2. Description of the Prior Art

The background of the present invention will be explained with its application to the fuel tank used with an automotive vehicle.

In general, in an automotive vehicle, a fuel feed pump is disposed out of a fuel tank. The fuel feed pump serves to feed fuel within the fuel tank to a carburetor or a fuel injection pump. In gasoline engines, fuel feed pumps of diaphragm type are mainly used, being driven mechanically, electronically or pneumatically. On the other hand, in diesel engines, fuel feed pumps of plunger type are mainly used, being driven electrically. However, in the case where the fuel feed pump is disposed out of a fuel tank, there exists a problem in that fuel vapor is liable to be produced due to heat, for instance, in an outlet pipe communicating between the fuel feed pump and the fuel tank, thus causing vapor lock. Once vapor lock occurs in the fuel feed system, since only vapor produced within the outlet pipe is mainly compressed or expanded by the fuel pump, it is impossible to feed fuel from the fuel tank to the carburetor, for instance, smoothly.

To overcome the above-mentioned problem, a fuel tank of in-tank fuel feed pump type has been proposed, for instance, in a Weekly Service Bulletin (No. 445, page 84) published by NISSAN MOTOR CO., LTD., October 1981, in which a fuel feed pump is supported within the fuel tank. In this type of fuel feed system, since fuel is directly supplied from the fuel tank to the carburetor, for instance, by the in-tank fuel feed pump, pressure in the outlet pipe of the fuel pump can readily be increased in order to prevent fuel from being vapored, thus it being possible to prevent vapor lock effectively in the fuel feed system.

In the prior-art in-tank fuel feed pump supporting device, however, there still exist several shortcomings as follows:

(1) The vibration damping elastic members are mainly deformed substantially only in compression mode in dependence upon the mounting structure thereof. Therefore, the damping coefficients of these elastic members are relatively great, thus it being impossible to effectively damp the vibration energy of the fuel feed pump.

(2) The fuel feed pump is disposed within the fuel tank in an uncovered state. Therefore, noise generated by the fuel pump is readily strengthened by the fuel tank with the tank body serving as a resonator, thus pump noise being readily transmitted to the outside of the fuel tank.

(3) The number of vibration damping elastic members are great. Therefore, various molds are necessary; the parts stock cost is high; the assembly process is rather complicated, thus resulting in a higher manufacturing cost.

The arrangement of the prior-art in-tank fuel feed pump supporting device will be described in greater detail hereinafter with reference to FIGS. 1 and 2 under DETAILED DESCRIPTION OF THE PREFERRED EMBODIMENTS.

SUMMARY OF THE INVENTION

With these problems in mind, therefore, it is the primary object of the present invention to provide an in-tank fuel feed pump supporting device which can improve all the vibration damping characteristics, the pump noise silencing characteristics and the manufacturing cost simultaneously in dependence upon a single vibration damping elastic member. In more detail, in the pump supporting device according to the present invention, the pump vibration damping elastic member is disposed between the fuel feed pump and the pump supporting stays, in order to improve vibration damping characteristics, in such a way that when the fuel pump vibrates in the axial direction thereof, the axial vibration energy is damped substantially only in shear mode. The pump vibration damping elastic member is disposed, in order to improve the pump noise silencing characteristics, in such a way that the outer surface of the fuel feed pump is covered by the elastic member. Only a single pump vibration damping elastic member is used with the supporting device according to the present invention, in order to reduce the manufacturing cost.

To achieve the above-mentioned object, the in-tank fuel feed pump supporting device according to the present invention comprises (a) a plurality of stays fixed to an under surface of a fuel tank lid and (b) a pump vibration damping elastic member for covering outer surfaces of the fuel feed pump to prevent fuel feed pump noise from being transmitted to the outside of the fuel tank and for supporting the fuel feed pump to the stays to damp pump vibration energy substantially in shear mode. Further, in plactice, each of the stays is so formed as to provide an oblong elastic member holding recess, and the pump vibration damping elastic member is so formed as to provide a plurality of mounting tabs or a flange both fitted to the oblong recess of each stay.

BRIEF DESCRIPTION OF THE DRAWINGS

The features and advantages of the in-tank fuel feed pump supporting device according to the present invention over the prior-art supporting device will be more clearly appreciated from the following description of the preferred embodiments of the invention taken in conjunction with the accompanying drawings in which like reference numerals designate the same or similar elements or sections throughout the figures thereof and in which.

Figure 5:
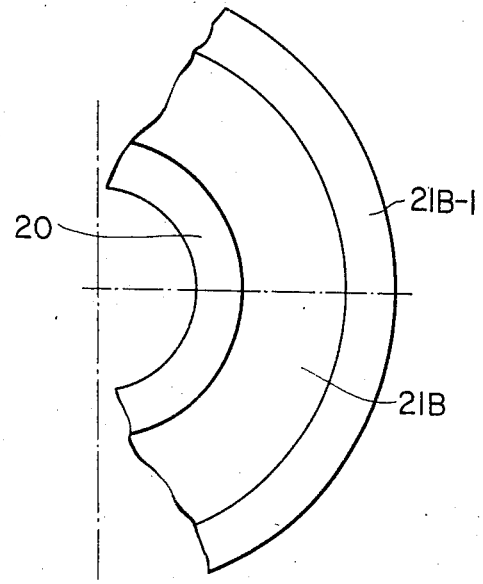
Figure 4:
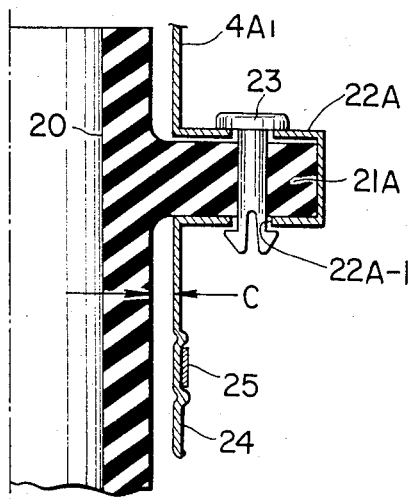
Figure 5:
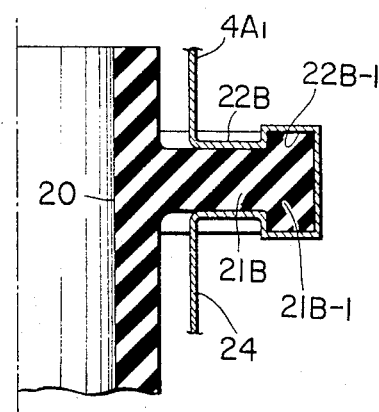

4A and of the mounting recess of the stay both used with the in-tank fuel feed pump supporting device according to the present invention;

FIG. 5A is a fragmentary top view of a second embodiment of the pump vibration damping elastic member used with the in-tank fuel feed pump supporting device according to the present invention; and FIG. 5B is a fragmentary cross-sectional view of the pump vibration damping elastic member shown in FIG. 5A and of the mounting recess of the stay both used with the in-tank fuel feed pump supporting device according to the present invention.

DETAILED DESCRIPTION OF THE PREFERRED EMBODIMENTS

To facilitate understanding of the present invention, a reference will be made hereinbelow to a prior-art in-tank fuel feed pump supporting device which has already disclosed in the above-mention Weekly Service Bulletin of NISSAN MOTOR CO., LTD., with reference to the attached drawings.

In FIGS. 1A and 1B, a fuel tank body 1 is formed by welding a circumferential flange portion $1a_1$ of an upper tank element $1a$ and a circumferential flange portion $1b^1$ of a lower tank element $1b$. The fuel tank body 1 is formed with an aperture 2 which is tightly closed by a tank lid 3 with a plurality of bolts and nuts. A fuel feed pump assembly P is fixed under the tank lid 3 by a plurality of upper stays $4a$ and a plurality of lower stays $4b$. In more detail, the upper stay $4a$ of tripod type, for instance, having three legs $4a_1$, $4a_2$, and $4a_3$ is fixed to the under surface of the tank lid 3 by welding, for instance. The lower stay $4b$ of also tripod type, for instance, having three legs $4b_1$, $4b_2$, and $4b_3$ is connected to the upper stay $4a$ with three vibration damping elastic members $5_1$, $5_2$ and $5_3$ disposed therebetween. A fuel feed pump 6 is disposed within a space enclosed by the three legs of the lower stay $4b$.

To connect the both upper and lower stays $4a$ and $4b$, each of the three vibration damping elastic members $5_1$, $5_2$ and $5_3$ is fitted to a hole formed in each flange $4b_1$-$f$, $4b_2$-$f$, or $4b_3$-$f$ of the three legs $4b_1$, $4b_2$, and $4b_3$ of the lower stay $4b$; each flange $4a_1$-$f$, $4a_2$-$f$ or $4a_3$-$f$ of three legs $4a_1$, $4a_2$, and $4a_3$ of the upper stay $4a$ is fixed to each elastic member $5_1$, $5_2$ or $5_3$ with each set of bolt $9_1$, nut $9_2$ and washer $9_3$ by passing each bolt $9_1$ through each hole formed in each flange $4a_1$-$f$, $4a_2$-$f$, or $4a_3$-$f$ and each bore formed in each elastic member $5_1$, $5_2$ or $5_3$. Further, the reference numeral 10 in FIG. 1 denotes a collar fitted to each bore of the elastic members $5_1$, $5_2$ and $5_3$.

To dispose the fuel feed pump 6 on or within the lower stay $4b$, the lower end portion of the fuel feed pump 6 is fixed to the annular portion $4b_4$ of the lower stay $4b$ with a small annular vibration damping elastic member 8 sandwiched therebetween. Further, the reference numeral 12 in FIG. 1 denotes a fuel filter disposed at the lower end portion of the fuel feed pump 6.

The fuel feed pump 6 has an inlet port 11 around which the fuel filter 12 is disposed and an outlet port 13 to which an elastic hose 14 is connected. An outlet pipe 15 is connected to the elastic hose 14. Further, the reference numeral 16 of FIG. 1 denotes a large annular vibration damping elastic member fitted to the outside surface of the fuel feed pump 6 for damping the radial vibrations of the pump 6 against the lower stay $4b$. Fuel within the fuel tank 1 is supplied to the carburetor, for instance, by way of the fuel filter 12, the inlet port 11 of the pump 6, the outlet port 13 of the pump 6, the elastic hose 14 and the outlet pipe 15.

In the prior-art in-tank fuel feed pump supporting device as described above, however, there exist several shortcomings. The basic problems are:

(1) Although the three elastic members $5_1$, $5_2$ and $5_3$ and the small annular elastic member 8 are so disposed as to damp the axial vibration energy of the fuel feed pump 6, these elastic members are substantially deformed only in compression mode, when the pump 6 vibrates up and down, in dependence upon the mounting structure thereof. Therefore, the damping coefficients of these elastic members are relatively great, thus it being impossible to effectively damp the axial vibration energy of the fuel feed pump 6. As a result, pump vibration is easily transmitted from the fuel pump 6 to the fuel tank 1 through the lower and upper stays $4b$ and $4a$ without having a good vibration damping effect.

(2) Since the fuel feed pump 6 is disposed within the fuel tank in an uncovered state, noise generated by the fuel pump 6 is readily strengthened by the fuel tank 1 because the tank serves as a resonator, thus pump noise being readily transmitted to the outside of the fuel tank 1.

(3) A number of vibration damping elastic members are necessary: three elastic members $5_1$, $5_2$ and $5_3$ disposed between upper and lower stays $4a$ and $4b$, a small annular elastic member 8 disposed between the fuel filter 12 and the annular portion $4b_3$ of the lower stay $4b$, and a large annular elastic member 16 disposed between the fuel pump body and the lower stay $4b$. Therefore, it is necessary to prepare a number of molds independently for forming various elastic members; the parts stock cost is high; the assembly process is rather complicated, thus resulting in a higher manufacturing cost.

In summary, the prior-art pump supporting device involves various problems in vibration damping characteristics, noise silencing characteristics and manufacturing cost.

In view of the above description, reference is now made to embodiments of the in-tank fuel feed pump supporting device according to the present invention with reference to the attached drawings. The structural features of the supporting device according to the present invention are: (1) a single vibration damping elastic member is so disposed between the fuel feed pump and the stays as to cover the outer periphery of the fuel feed pump to reduce pump noise, and (2) a plurality of mounting tabs or a single flange is so formed integrally with the elastic member as to be deformed substantially only in shear mode when the fuel feed pump vibrates in the axial direction thereof.

Figure 1:
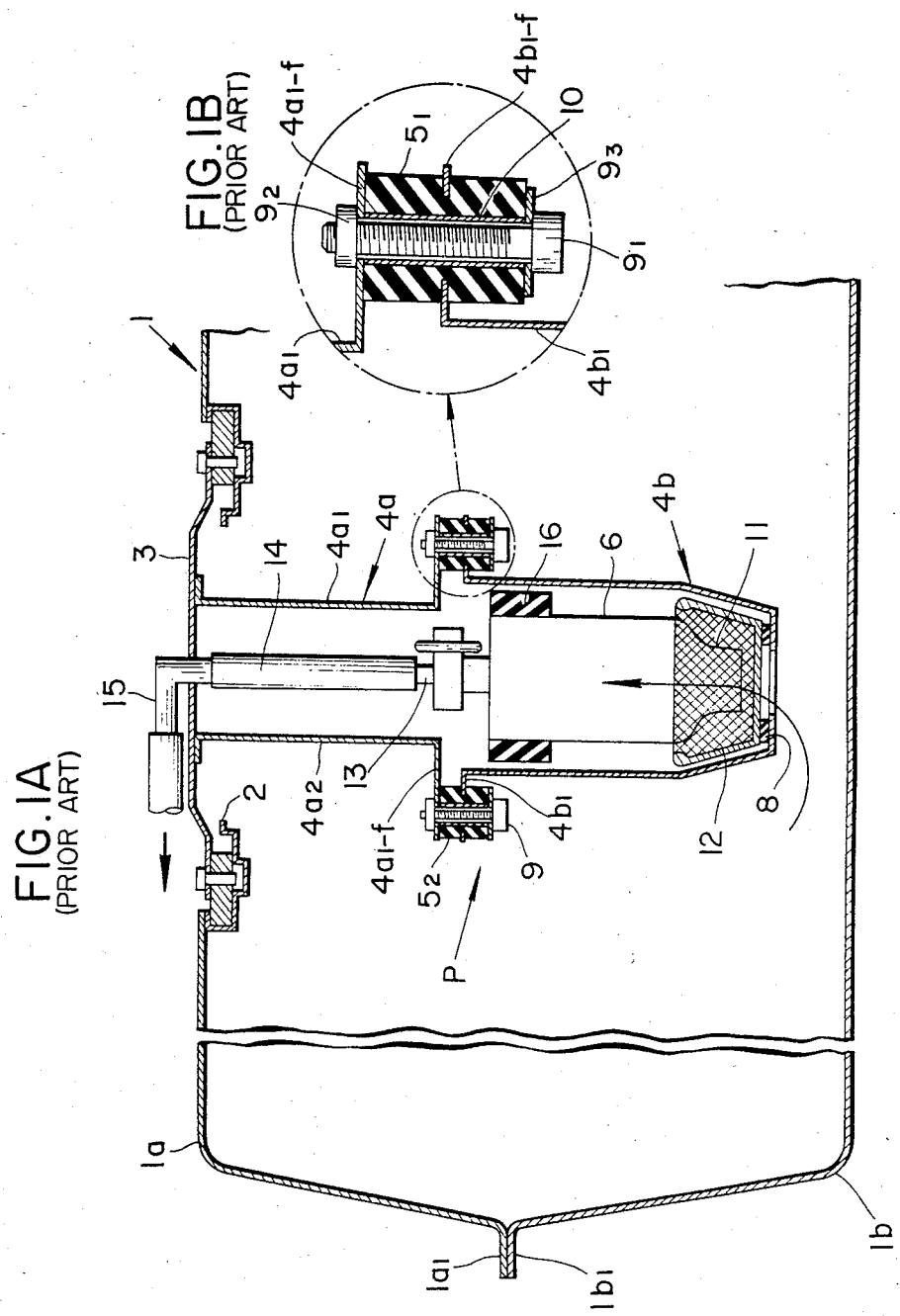
FIGS. 1A and 1B are a cross-sectional view of a prior-art fuel feed pump supporting device arranged within a fuel tank, and a partially enlarged cross-sectional view, respectively.
Figure 2:
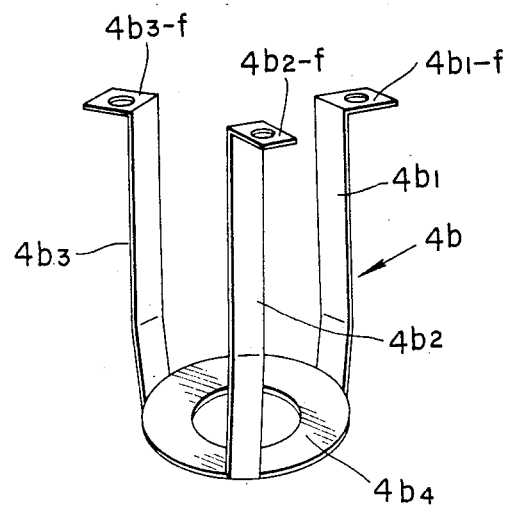
FIG. 2 is a perspective view of an upper stay of tripod type used with the prior-art in-tank fuel feed pump supporting device shown in FIG. 1.
Figure 3:
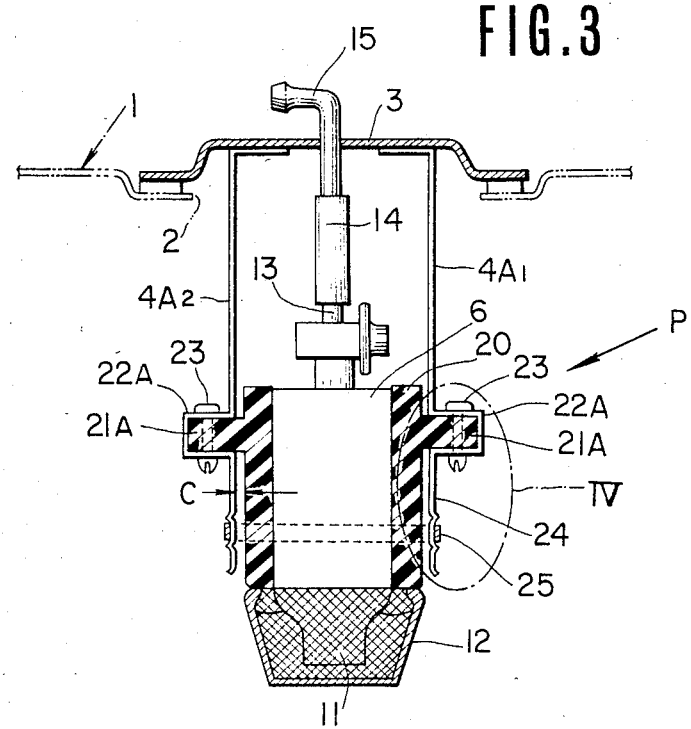
FIG. 3 is a cross-sectional view of the in-tank fuel feed pump supporting device according to the present invention.
Figure 4:
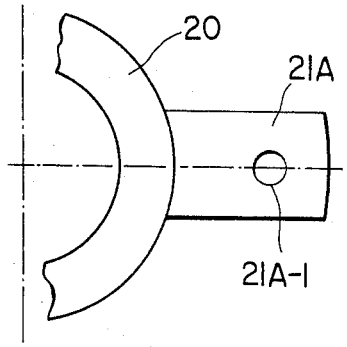
FIG. 4A is a fragmentary top view of a first embodiment of the pump vibration damping elastic member used with the in-tank fuel feed pump supporting device according to the present invention.
FIG. 4B is a fragmentary cross-sectional view of the pump vibration damping elastic member shown in FIG.

In FIG. 3, the fuel feed pump assembly P is fixed under the lid 3 of the fuel tank 1 by a plurality of stays 4A in a symmetrical, cylindrical array, for instance, three stays $4A_1$, $4A_2$ and $4A_3$, similarly to the prior-art supporting device shown in FIG. 1. The peripheral portion of the fuel feed pump 6 is entirely covered by a single vibration damping elastic member 20 made of a vibration-proof rubber. This elastic member 20 is formed with a plurality of mounting tabs 21A near the upper portion and around the outer periphery of the elastic member 20, as depicted in FIGS. 4A and 4B. A hole 21A-1 is formed at an appropriate position of each mounting tab 21A to support the elastic member 20 to the stay 4A.

On the other hand, each stay $4A_1$, $4A_2$ or $4A_3$ is formed with an oblong elastic member holding recess 22A to which each mounting tab 21A of the elastic member 20 is fitted. The above oblong holding recess 22A is formed by bending each stay $4A_1$, $4A_2$ or $4A_3$ at a position a little lower than the middle portion of the stay 4A. Similarly, two holes 22A-1 are formed at an appropriate position of each oblong elastic member holding recess 22A to hold the elastic member 20 to the stay 4A. Therefore, the elastic member 20 is elastically supported by the three stays $4A_1$, $4A_2$ and $4A_3$ with each tab 21A thereof fitted to the oblong holding recess 22A of the stay. Further, each tab 21A and each recess 22A are connected to each other by passing a split pin 23 through the holes 22A-1 of the oblong holding recess 22A and the hole 21A-1 of the tab 21A.

Further, each stay 4A has an extension 24 in the downward direction in order to restrict the radial movement of the fuel feed pump 6. In FIGS. 3 and 4B, the reference numeral 25 denotes a ring disposed around the outer surfaces of the stays $4A_1$, $4A_2$ and $4A_3$ in order to restrict the outward deformation of the extensions 24 of the stays when the fuel feed pump 6 vibrates excessively in the radial direction thereof.

In FIGS. 3 and 4B, it should be noted that there exists a clearance C between the outer circumferential surface of the elastic member 20 and the inner surface of the stay 4A. This clearance C serves to deform the tab 21A of the elastic member 20 substantially vertically or in shear mode when the fuel feed pump 6 vibrates in the axial direction thereof together with the elastic member 20.

FIGS. 5A and 5B show a second embodiment of the elastic member 20 used with the pump supporting device according to the present invention. In this embodiment, the vibration damping elastic member 20 is formed with a flange 21B around the periphery of the elastic member 20. In this case, it is more preferable to form a thicker rim portion 21B-1 which is enlarged in the axial direction of the elastic member 20 at the outermost position of the flange 21B and to form two vertical recesses 22B-1 in the oblong recess 22B of the stay 4A so as to fit the rim 21B-1 thereto. In this second embodiment, it is possible to eliminate the use of the split pin 23 as in the first embodiment shown in FIGS. 3A and 4B.

The in-tank fuel feed pump supporting device according to the present invention results in the following features:

(1) Since only a single pump vibration damping elastic member is used, only a single mold to manufacture a single elastic member is necessary; the parts stock cost is low; the assembly process is simple, thus the manufacturing cost being reduced.

(2) Since the fuel feed pump is supported by the mounting tabs or the mounting flange of the vibration damping elastic member, when the pump vibrates in the axial direction, the elastic member is deformed substantially in shear mode. Therefore, the damping coefficient of the elastic member is relatively small, thus it being possible to effectively damp the vertical vibration energy of the fuel pump. As a result, it is possible to markedly reduce the vibration energy transmitted from the fuel pump to the fuel tank.

(3) Further, since the lower portions of the stays extend so as to restrict the radial movement of the fuel pump via the vibration damping elastic member, even when the vehicle is accelerated or decelerated quickly and therefore a great acceleration or deceleration is applied to the fuel pump, it is possible to restrict the radial vibration of the pump or to prevent the pump from being brought into contact with other parts (not shown) such as tubes, gauges, etc. housed within the fuel tank.

(4) Since the fuel pump is almost covered by the vibration damping elastic member, it is possible to prevent noise produced from the pump from being amplified by the fuel tank on the basis of resonance effect.

As described above, in the in-tank fuel feed pump supporting device according to the present invention, since only a single pump vibration damping elastic member is provided so as to cover the fuel feed pump and since the elastic member is so supported by the stays that the axial pump vibration energy can be damped by the elastic member deformed substantially in shear mode, it is possible to improve the pump supporting device in pump noise silencing characteristics, pump vibration energy damping characteristics, and manufacturing cost.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A device for supporting a fuel feed pump disposed within a fuel tank having a tank lid comprising:

a plurality of elongated stays fixed to an undersurface of said tank lid to extend vertically in a substantially symmetrical arrangement around a space having an axis, each of said stays having portions substantially parallel to said axis and an intermediate bent U-shaped portion defining a recess, the recesses of the plurality of stays facing said space;

vibration damping and supporting means including an elastic member around a fuel feed pump in said space on said axis and between said pump and said stays, said elastic member having an integral mounting portion extending outward relative to said axis, said mounting portion having a shape adapted to be fitted in said recesses of said stays for supporting said fuel feed pump by said stays and elastic member and damping vibration energy produced substantially in shear mode by said fuel feed pump when said fuel feed pump vibrates in the direction of said axis; and the outer periphery of said vibration damping and supporting means elastic member having clearance with said substantially parallel portions of said stays for allowing said integral mounting portion to be deformed substantially vertically in shear mode when said fuel feed pump vibrates in the direction of said axis.

2. The device for supporting a fuel feed pump as set forth in claim 1 wherein each recess of said stays comprises an oblong recess;

said vibration damping elastic member mounting portion is fitted to the oblong recesses in said stays; and a plurality of split pins are provided for fixedly supporting said mounting portion of said vibration damping elastic member to said stays.

3. The device for supporting a fuel feed pump as set forth in claim 1 wherein said parallel portions of each of said stays adjacent the elastic member restricts radial movement of the fuel feed pump.

4. The device for supporting a fuel feed pump as set forth in claim 3 which further comprises a ring disposed around outer surfaces of said stays for restricting outward deformation of said extensions of said stays when the fuel feed pump vibrates excessively in the radial direction thereof.

5. The device for supporting a fuel feed pump as set forth in claim 1 wherein each recess of said stays comprises an oblong recess; and said integral mounting portion of said vibration damping elastic member comprises an annular flange fitted to the oblong recesses of said stays.

6. The device for supporting a fuel feed pump as set forth in claim 5 wherein said bent U-shaped portion of each said stay defines an irregular recess having sections of different dimensions; and said annular flange of said vibration damping elastic member comprises a rim formed at the outermost portion of said annular flange and said irregular recess of each stay is shaped to receive said rim.

7. The device for supporting a fuel feed pump as set forth in claim 5 wherein, each of said stays includes an extension for restricting radial movement of the fuel feed pump.

8. The device for supporting a fuel feed pump as set forth in claim 7, which further comprises a ring disposed around outer surfaces of said stays for restricting outer deformation of said extensions of said stays when the fuel feed pump vibrates excessively in the radial direction thereof.

* * * * *